United States Patent [19]
Schrider

[11] 3,962,458
[45] June 8, 1976

[54] SYSTEMIC CONTROL OF ECTOPARASITES WITH PYRETHROIDS

[75] Inventor: Michael Stanley Schrider, South Bound Brook, N.J.

[73] Assignee: American Cyanamid Company, Stamford, Conn.

[22] Filed: Feb. 13, 1975

[21] Appl. No.: 550,106

[52] U.S. Cl. ............................ 424/304; 424/305; 424/306; 424/308
[51] Int. Cl.² ........................................ A01N 9/20
[58] Field of Search ........... 424/304, 306, 305, 308; 260/468 G, 464, 465 D

[56] References Cited
UNITED STATES PATENTS

| | | | |
|---|---|---|---|
| 3,647,857 | 3/1972 | Morgan | 424/306 X |
| 3,823,177 | 7/1974 | Fanta et al. | 260/468 G |
| 3,835,176 | 9/1974 | Matsuo et al. | 424/306 X |

*Primary Examiner*—Leonard Schenkman
*Attorney, Agent, or Firm*—H. G. Jackson

[57] ABSTRACT

This invention is the use of m-phenoxybenzyl esters of spirocarboxylic acids as systemic insecticidal and acaricidal agents for treatment of homothermic animals.

10 Claims, No Drawings

SYSTEMIC CONTROL OF ECTOPARASITES WITH PYRETHROIDS

CROSS REFERENCE TO RELATED APPLICATIONS

Roger W. Addor's copending application Ser. No. 550,105 filed of even date discloses the compounds useful in my invention.

BACKGROUND OF THE INVENTION

1. Field of the Invention

The field of the invention is systemic control of ectoparasites with pyrethroids.

2. The Prior Art

Pyrethrin-like chemical compounds (pyrethroids) are known in the chemical art. Many such compounds have been shown to possess insecticidal properties. My invention provides a process wherein pyrethroids are highly effective systemic insecticidal and acaricidal agents useful for the treatment of warm-blooded or homothermic animals. U.S. Pat. Nos. 3,835,176, issued Sept. 10, 1974 and 3,823,177, issued July 9, 1974. The 3,835,176 Patent, Matsuo et al. discloses alpha-cyano-benzyl cyclopropanecarboxylates as insecticidal agents. There is no disclosure of animal systemic insecticidal or acaricidal properties. The 3,823,177 Patent to Fanta et al. relates to insecticidal esters of spirocarboxylic acids. However, like the 3,835,176 Patent, Fanta et al. do not suggest animal systemic activity.

SUMMARY OF THE INVENTION

The invention is a method for the systemic control of ectoparasites, particularly insects and acarina which parasitize homothermic animals which comprises administering to the animals a systemically effective amount against the pests of a phenoxybenzyl ester of a spirocarboxylic acid of the formula:

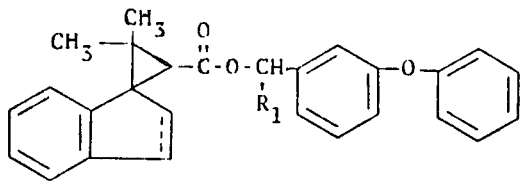

(I)

and

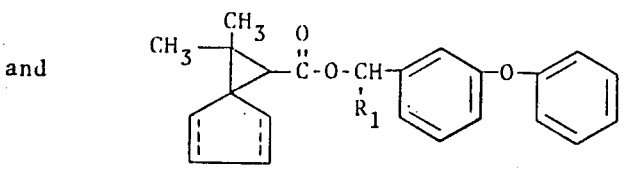

(II)

wherein $R_1$ is hydrogen, cyano or ethylnyl, = represents a single or double bond, and the optical and geometric isomers thereof.

DETAILED DESCRIPTION

The phenoxybenzyl esters of benzospirocarboxylic acids depicted by formula I, can be prepared by reacting approximately equimolar amounts of an acid halide, preferably the chloride, of a benzospirocarboxylic acid (IV) and a m-phenoxybenzyl alcohol (V). The reaction is generally conducted in the presence of a suitable solvent such as benzene, toluene, diethyl ether, or the like, at a temperature between about 10°C and 30°C., and in the presence of an acid acceptor such as an organic tertiaryamine such as triethylamine, trimethylamine, pyridine, or the like. The reaction can be graphically illustrated as follows:

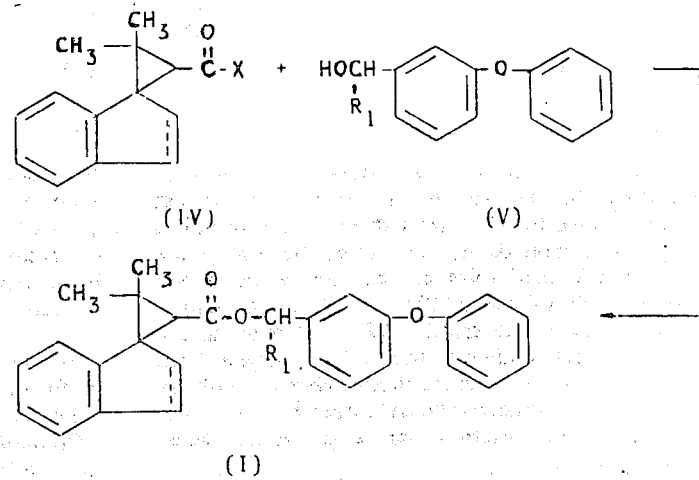

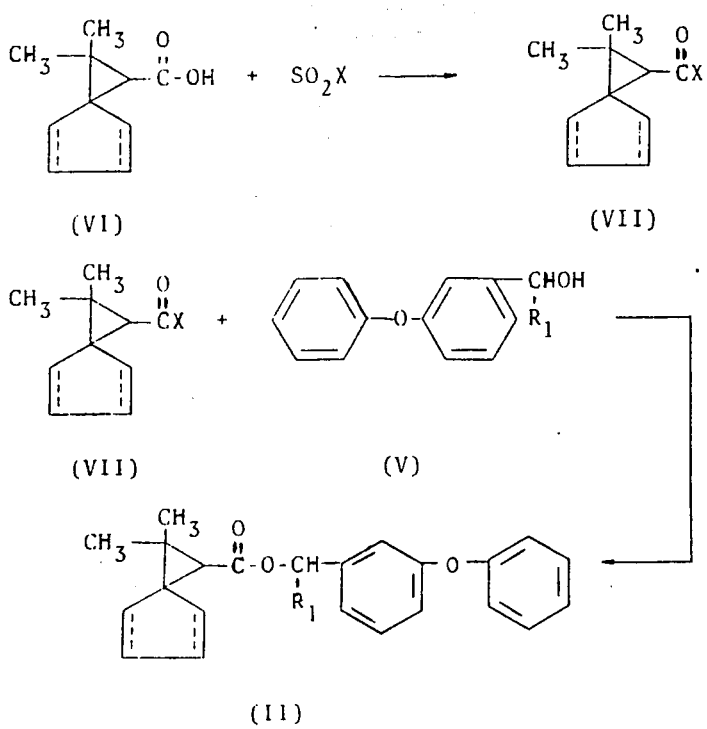

wherein $R_1$ is hydrogen, cyano, or ethynyl, and X is halogen, preferably chloro.

The benzospirocarboxylic acid halide (IV) is readily obtained by reaction of the appropriate benzospirocarboxylic acid (III) with a thionyl halide such as thionyl chloride, thionyl bromide or thionyl fluoride or a phosphorus halide such as phosphorus trichloride or phosphorus oxychloride in the presence of an organic solvent such as toluene, benzene or benzenehexane mixture. This reaction may be conducted at room temperature but is preferably conducted at 60°–90°; and can be illustrated as follows:

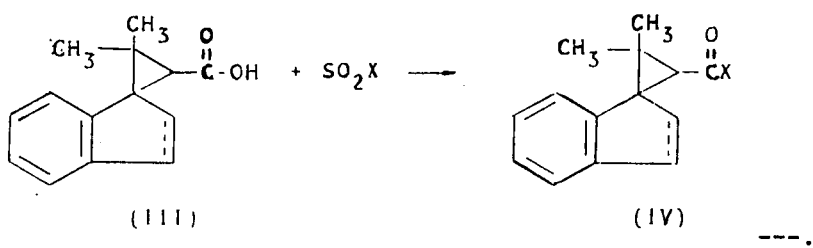

The formula II phenoxybenzyl esters of spirocarboxylic acids can be prepared in a manner similar to that described above for the preparation of the formula I benzospiro compounds, by substituting the appropriate spirocarboxylic acid (VI) for the above-mentioned benzospirocarboxylic acid (III); converting said acid to its corresponding acid halide (VII) and reacting the thus-formed acid halide with m-phenoxybenzyl alcohol (V), under the conditions mentioned above, to obtain the formula (II) m-phenoxybenzyl ester of the spirocarboxylic acid. This reaction can be graphically illustrated as follows:

wherein X is halogen, preferably chloro, and $R_1$ is hydrogen, cyano, or ethynyl.

In accordance with this invention, it should also be understood that various geometric isomers as well as optical isomers of the above-identified compounds do result from the preparations described. For example, in the synthesis of the 2,2-dimethylspiro[2,4]hepta-4,6-diene-1-carboxylic and 2,2-dimethylspiro[2,4]hepta-4-ene-1-carboxylic acid esters of m-phenoxy benzyl alcohol, d and l isomeric pairs are formed. In the preparation of the α-cyano- and α-ethynyl-m-phenoxybenzyl esters, an additional chiral center is introduced, and this allows for additional d,l pairs. Additionally, the esters derived from 2,2-dimethyl-4,5-benzospiro[2,4]hepta-4,6-diene-1-carboxylic acid and 2,2-dimethyl-4,5-benzospiro[2,4]hepta-4-ene-1-carboxylic acid will be further complicated by the presence of cis and trans isomers.

Further examples of the preparation of compounds useful in my invention are disclosed in Dr. Addor's copending application cross-referenced above.

Preparation of these compounds is demonstrated by the non-limiting examples provided below.

EXAMPLE 1

Preparation of 2,2-Dimethyl-4,5-benzospiro[2,4-]hepta-4,6-diene-1-carboxylic acid m-phenoxybenzyl ester.

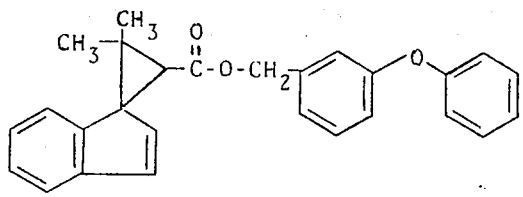

To 4.3 g (0.02 mol) of 2,2-dimethyl-4,5-benzospiro-2,4-hepta-4,6-diene-1-carboxylic acid in ether hexane/benzene or benzene is added 8 ml of thionyl chloride. The solution is then stirred for 12 hours at room temperature. The solvent is then removed in vacuo leaving 4.7 g. of an orange liquid (theoretical yield). Infrared indicates an acid chloride carbonyl at 1790 cm$^{-1}$.

The acid chloride and 4.0 g (0.02 mol) of m-phenoxy benzyl alcohol are dissolved in 20 ml of ether, and 2.1 g (0.02 mol) of triethylamine dissolved in 8 ml of ether is added dropwise at 20°C. Solids precipitate from solution immediately. The resulting mixture is stirred for 12 hours at room temperature. The crude product is partitioned in an ether/water mixture, and the ether layer is dried over magnesium sulfate and concentrated in vacuo to yield 7.7 g (96% theory) of a brown liquid.

The crude product is purified by dry-column chromatography on silica gel using 25% methylene chloride in hexane as a solvent. 4.4 Grams of a pale yellow liquid is obtained. The infrared spectrum shows an ester carbonyl band at 1720 cm$_{+}$$^1$. The nuclear magnetic resonance spectrum (CCl$_4$) shows the following: δ = 1.41, 1.45, 1.58, 1.66 (4S, 6H, methyls), 2.61 (S, 1H, cyclopropane H), 4.85-5.10 (m, 2H, O-CH$_2$), 6.12 (d, 0.5H, J = 5.5 Hz, vinyl), 6.66-7.76 (m, 14.5H aromatic and vinyl).

Analyses: Calculated for C$_{27}$H$_{24}$O$_3$: C, 81.83; H, 6.06. Found: C, 82.14; H, 6.29.

EXAMPLE 2

Preparation of 2,2-Dimethyl-4,5-benzospiro[2,4-]hepta-4,6-diene-1-carboxylic acid, α-cyano-m-phenoxybenzyl ester.

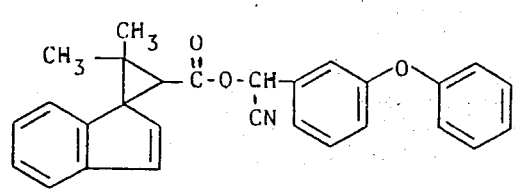

2,2-Dimethyl-4,5-benzospiro[2,4]hepta-4,6-diene-1-carboxylic acid, 3.4 g, is dissolved in 100 ml of a hexane/benzene (4:1) solution. Thionyl chloride, 15.0 g, is then added and the solution is stirred for 12 hours. Refluxing is carried out for 20 minutes, and the volume is reduced in vacuo to remove solvents and excess thionyl chloride. The acid chloride is used directly without further purification. The acid chloride is taken up in 20 ml of benzene and is added dropwise to a solution of 3.1 g of α-cyano-m-phenoxybenzyl alcohol and 1.0 g of pyridine in 100 ml of benzene. After 4 hours, the precipitate is filtered, and the filtrate reduced in vacuo to give a viscous oil. Purification by column chromatography on silica gel with elution by chloroform/hexane (1:2) gives 1.3 g of pale yellow oil which exhibits the following spectral properties: infrared spectrum (neat film) 1730 cm$^{-1}$; nuclear magnetic resonance spectrum (CDCl$_3$) δ = 6.8 -7.6 (m, 14.5H, aromatic and vinyl), 6.37 (m, 1H,

6.22 (d, 0.5H, vinyl), 2.73 (m, 1H,

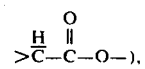

1.72-1.43 (m, 6H, methyls).

EXAMPLE 3

Preparation of 2,2-Dimethyl-4,5-benzospiro[2,4-]hepta-4-ene-1-carboxylic acid, m-phenoxybenzyl ester.

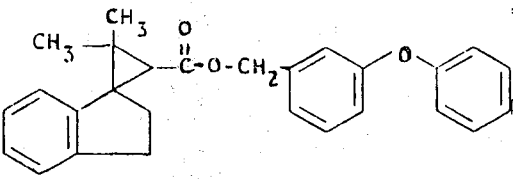

The procedure of Example 1 is followed using 2,2-dimethyl-4,5-benzospiro[2,4]hepta-4-ene-1-carboxylic acid in place of 2,2-dimethyl-4,5-benzospiro[2,4]hepta-4,6-diene-1 carboxylic acid to give the crude product as an oil. The pure ester obtained by chromatography had the following spectral properties: Infrared spectrum (heat film) 1720 cm$^{-1}$; nuclear magnetic resonance spectrum (CCl$_4$) δ = 6.7-7.6 (m, 13H, aromatic), 4.8-51 (m, 2H, O-CH$_2$), 1.1-3.2 (m, 11H, CH$_3$, indane CH$_2$, and cyclopropane H).

EXAMPLE 4

Preparation of 2,2-Dimethyl-4,5-benzospiro[2,4]hepta-4-ene-1-carboxylic acid, α-cyano-m-phenoxybenzyl ester.

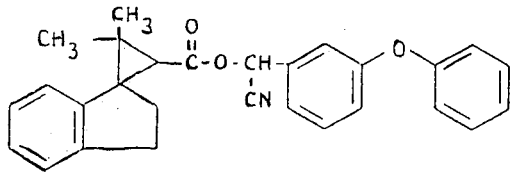

The procedure of Example 2 is followed using 2,2-dimethyl-4,5-benzospiro[2,4]hepta-4-ene-1-carboxylic acid in place of 2,2-dimethyl-4,5-benzospiro[2,4]hepta-4,6-diene-1-carboxylic acid to give the crude product.

EXAMPLE 5

Preparation of 2,2-Dimethylspiro[2,4]hepta-4,6-diene-1-carboxylic acid, m-phenoxybenzyl ester.

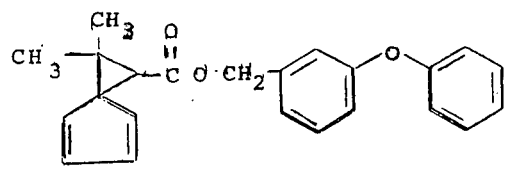

The procedure of Example 1 is followed using 2,2-dimethyl[2,4]hepta-4,6-diene-1-carboxylic acid in place of 2,2-dimethyl-4,5-benzospiro[2,4]hepta-4,6-diene-1-carboxylic acid to give the crude product.

EXAMPLE 6

Preparation of 2,2-Dimethylspiro[2,4]hepta-4,6-diene-1-carboxylic acid, α-cyano-m-phenoxybenzyl ester.

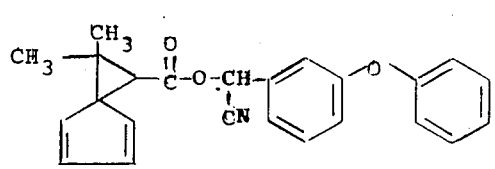

The procedure of Example 2 is followed using 2,2-dimethylspiro[2,4]hepta-4,6-diene-1-carboxylic acid in place of 2,2-dimethyl-4,5-benzospiro[2,4]hepta-4,6-diene-1-carboxylic acid to give the crude product.

EXAMPLE 7

Preparation of 2,2-dimethylspiro[2,4]heptane-1-carboxylic acid, m-phenoxybenzyl ester.

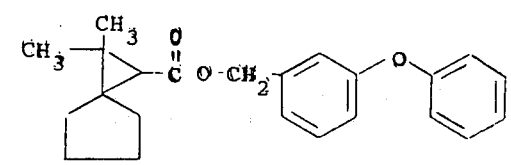

The procedure of Example 1 is followed using 2,2-dimethylspiro[2,4heptane-1-carboxylic acid in place of 2,2-dimethyl-4,5-benzospiro[2,4]hepta-4,6-diene-1-carboxylic acid to give the crude product. The pure ester obtained by chromatography has the following spectral properties: Infrared spectrum (neat film) 1730 cm$^{-1}$; nuclear magnetic resonance spectrum (CCl$_4$) δ = 6.8–7.4 (m, 9H, aromatic), 5.0 (s, 2H, O-CH$_2$), 1.4–1.7 (m, 8H, cyclopentane CH$_2$), 1.1 (s. 3H, CH$_3$), 1.2 (s, 3H, CH$_3$).

EXAMPLE 8

Preparation of 2,2-Dimethylspiro[2,4]heptane-1-carboxylic acid α-cyano-m-phenoxybenzyl ester.

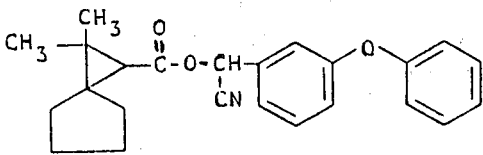

The procedure of Example 2 is followed using 2,2-dimethylspiro[2,4]heptane-1-carboxylic acid in place of 2,2-dimethyl-4,5-benzospiro[2,4]hepta-4,6-diene-1-carboxylic acid to give the crude product.

It must be recognized that various geometric isomers as well as optical isomers result from these preparations. Thus, in the case of the 2,2-dimethylspiro[2,4]hepta-4,6-diene-1-carboxylic acid and 2,2-dimethylspiro[2,4]hepta-4,6-diene-1-carboxylic acid and 2,2-dimethylspiro[2,4]heptane-1-carboxylic acid esters of m-phenoxybenzyl alcohol, d and l isomeric pairs will result. Where the α-cyano and α-ethynyl m-phenoxybenzyl esters are formed, an additional chiral center is introduced allowing for additional d, l pairs. Although in most instances the separation of these isomers may not be practical, it is recognized that they will differ in the degree of effectiveness and the spectrum of their activity against the many insects and other pests of economic importance. In addition, the subject esters derived from 2,2-dimethyl-4,5-benzospiro[2,4]hepta-4,6-diene-1-carboxylic acid and 2,2-dimethyl-4,5-benzospiro[2,4]-hepta-5-ene-1-carboxylic acid will be further complicated by the presence of cis and trans isomers. These different esters are also expected to show differing degrees of insecticidal activity when separately tested.

EXAMPLE 9

Preparation of 2,2-Dimethyl-4,5-benzospiro[2,4]hepta-4,6-diene-1-carboxylic acid, α-ethynyl-m-phenoxybenzyl ester.

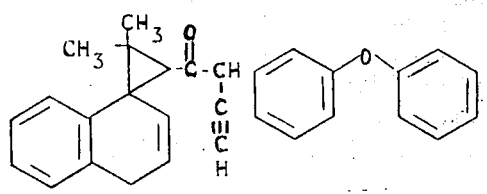

The procedure of Example 1 is followed using 2,2-dimethyl-4,5-benzospiro[2,4]hepta-4-ene-1-carboxylic acid in place of 2,2-dimethyl-4,5-benzospiro[2,4]hepta-4,6-diene 1-carboxylic acid and α-ethynyl-m-phenoxybenzyl alcohol in place of m-phenoxybenzyl alcohol to give the product as an oil.

EXAMPLE 10

Preparation of 2,2-Dimethyl-4,5-benzospiro[2,4]hepta-4-ene-1-carboxylic acid, α-ethynyl-m-phenoxybenzyl ester.

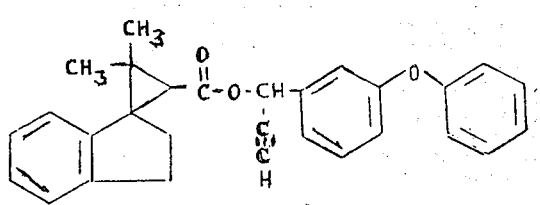

The procedure of Example 1 is followed using 2,2-dimethyl-4,5-benzospiro[2,4]hepta-4-ene-1-carboxylic acid in place of 2,2-dimethyl-4,5-benzospiro[2,4]hepta-4,6-diene 1-carboxylic acid and α-ethynyl-m-phenoxybenzyl alcohol in place of m-phenoxybenzyl alcohol to give the product as an oil.

EXAMPLE 11

Preparation of 2,2-Dimethylspiro[2,4]hepta-4,6-diene-1-carboxylic acid, α-ethynyl-m-phenoxybenzyl ester.

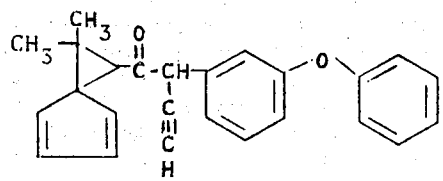

The procedure of Example 1 is followed using 2,2-dimethylspiro[2,4]hepta-4,6-diene-1-carboxylic acid in place of 2,2-dimethyl-4,5-benzospiro[2,4]hepta-4,6-diene-1-carboxylic acid and α-ethynyl-m-phenoxybenzyl alcohol in place of m-phenoxybenzyl alcohol to give the product as an oil.

EXAMPLE 12

Preparation of 2,2-Dimethylspiro[2,4]heptane-1-carboxylic acid, α-ethynyl-m-phenoxybenzyl ester.

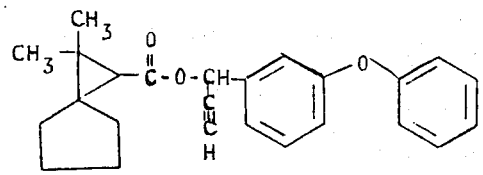

The procedure of Example 1 is followed using 2,2-dimethylspiro[2,4]heptane-1-carboxylic acid in place of 2,2-dimethyl-4,5-benzospiro[2,4]hepta-4,6-diene-1-carboxylic acid and α-ethynyl-m-phenoxybenzyl alcohol in place of m-phenoxybenzyl alcohol to give the product as an oil.

Compounds useful in the invention are, for example:
2,2-Dimethyl-4,5-benzospiro[2,4]hepta-4,6-diene-1-carboxylic acid, m-phenoxybenzyl ester;
2,2-Dimethyl-4,5-benzospiro[2,4]hepta-4,6-diene-1-carboxylic acid, α-cyano-m-phenoxybenzyl ester;

2,2-Dimethyl-4,5-benzospiro[2,4]hepta-4-ene-1-carboxylic acid, m-phenoxybenzyl ester;

2,2-Dimethyl-4,5-benzospiro[2,4]hepta-4-ene-1-carboxylic acid, α-cyano-m-phenoxybenzyl ester;

2,2-Dimethylspiro[2,4]hepta-4,6-diene-1-carboxylic acid, m-phenoxybenzyl ester;

2,2-Dimethylspiro[2,4]hepta-4,6-diene-1-carboxylic acid, α-cyano-m-phenoxybenzyl ester;

2,2-Dimethylspiro[2,4]heptane-1-carboxylic acid, m-phenoxybenzyl ester;

2,2-Dimethylspiro[2,4]heptane-1-carboxylic acid, α-cyano-m-phenoxybenzyl ester;

2,2-Dimethylspiro[2,4]heptane-1-carboxylic acid, α-ethynyl-m-phenoxybenzyl ester;

2,2-Dimethylspiro[2,4]hepta-4,6-diene-1-carboxylic acid, α-ethynyl-m-phenoxybenzyl ester;

2,2-Dimethyl-4,5-benzospiro[2,4]hepta-4-ene-1-carboxylic acid, α-ethynyl-m-phenoxybenzyl ester; and 2,2-Dimethyl-4,5-benzospiro[2,4]hepta-4,6-diene-1carboxylic acid, α-ethynyl-m-phenoxybenzyl ester.

The compounds can be administered to the animal host either orally or parenterally for use as animal systemic insecticidal and acaricidal agents. When given orally, it may be in any convenient form designed for oral administration such as a bolus, capsule, tablet or as an oral drench. The active agent may also be incorporated in an edible animal feedstuff such as a nutritionally balanced diet containing from 0.01% to 3.0%, and preferably 0.01% to 1.5% by weight of feed of the active compound.

If desired, the systemic insecticidal and acaricidal agent may be introduced into the body of the animal by subcutaneous, intramuscular or intraperitoneal injection, such that it may be distributed through the animal's body by the action of the animal's circulatory system. In practice, the systemic agent may be dissolved or dispersed in a pharmaceutically acceptable carrier such as water, propylene glycol, vegetable oil, glycerol formal, or the like, for administration.

Advantageously, the systemic agents of this invention have relatively low mammalian toxicity and are effective for protecting a variety of animals, particularly livestock and domestic animals such as cattle, sheep, horses, dogs, cats, zoo and laboratory animals and the like, from attack by fleas, mosquitoes, flies, ticks, and the like.

The invention is further demonstrated by the examples provided below.

EXAMPLE 1

Systemic Control of Stable Flies on Mice

α-Cyano-m-phenoxybenzyl ester of 2,2-dimethyl-4,5-benzospiro[2,4]hepta-4,6-diene-1-carboxylic acid is dissolved in 10% acetone/90% corn oil and administered orally (by gavage) to two 20 g Swiss-Webster white female mice at 400 mg/kg. One mouse is dosed with 10% acetone/90% corn oil and used as a control.

One hour after treatment, 9 stable flies (*Stomoxys calcitrans*) are placed in a cage with each mouse and allowed 4½ hours to feed. Within 1½ hours after the flies are placed with the mice, all flies in the treated group are "knocked down." The flies are held overnight and mortality measured at 24 hours.

| Number Mice Treated | Dose (mg/kg) | Number Flies On | Number Dead After 24 Hours |
|---|---|---|---|
| 2 | 400 | 18 | 17 |
| 1 | 0 | 9 | 2 |

EXAMPLE 2

Animal Systemic Insecticidal Activity

To determine the effectiveness of the compounds of the present invention as animal systemic insecticidal agents, the m-phenoxybenzyl ester of 2,2-dimethyl-4,5-benzospiro[2,4]hepta-4,6-diene-1-carboxylic acid; and the α-cyano-m-phenoxybenzyl ester of 2,2-dimethyl-4,5-benzospiro[2,4]-hepta-4,6-diene 1-carboxylic acid are mixed in 10% acetone-90% sesame oil and administered by gavage to 2 mice each at 25, 100, 200 and 400 mg/kg of animal body weight.

Adult, one day old, unfed stable flies *Stomoxys calcitrans* are then exposed to the mice for 18 hours to permit them to feed on said mice. Mortality counts are made at 24 hours and data obtained are reported below.

| Compound | No. Mice Treated | Dose mg/kg | No. Flies | No. of Flies Dead |
|---|---|---|---|---|
| 2,2-Dimethyl-4,5-benzo- | 2 | 400 | 20 | 20 |
| spiro[2,4]hepta-4,6-diene- | 2 | 200 | 20 | 20 |
| 1-carboxylic acid, m- | 2 | 100 | 20 | 10 |
| phenoxybenzyl ester | 2 | 25 | 20 | 2 |
|  | 2 | 0 | 20 | 0 |
| 2,2-Dimethyl-4,5-benzo- | 2 | 400 | 20 | 20 |
| spiro[2,4]hepta-4,6-diene- | 2 | 200 | 20 | 20 |
| 1-carboxylic acid, α-cyano- | 2 | 100 | 20 | 20 |
| m-phenoxybenzyl ester | 2 | 25 | 20 | 9 |
|  | 2 | 0 | 20 | 0 |

EXAMPLE 3

Ixodicidal Activity

Effective control of acarina larvae is demonstrated in the following tests with larvae of *Boophilus microplus*, a one-host tick which can remain on a single host through its three life stages, i.e., larvae, nymph and adult. In these tests, a 10% acetone — 90% water mixture contains 3.1, 12.5 or 50 ppm of test compound. Twenty larvae are enclosed in a pipet sealed at one end with a gauze material and solution containing the test compound is then drawn through the pipet with a vacuum hose, the whole simulating a spray system. The ticks are then held for 48 hours at room temperature and mortality is determined. The results achieved are set forth below.

| Compound | % Mortality *Boophilus microplus* larvae |
|---|---|
| 2,2-Dimethyl-4,5-benzo-spiro[2,4]hepta-4,6-diene-1-carboxylic acid, m-phenoxybenzyl ester | 100% at 50 ppm<br>100% at 12.5 ppm<br>100% at 3.1 ppm |
| 2,2-Dimethyl-4,5-benzo spiro[2,4]hepta-4,6-diene-1-carboxylic acid, α-cyano-m-phenoxybenzyl ester | 100% at 50 ppm<br>100% at 12.5 ppm<br>80% at 3.1 ppm |

Comparable results to those in the tables are obtained with the other compounds claimed in the invention.

I claim:

1. A method for the systemic control of ectoparasites which attack warm-blooded animals, comprising administering to said warm-blooded animals a systemically effective amount against the ectoparasites of a compound having a formula

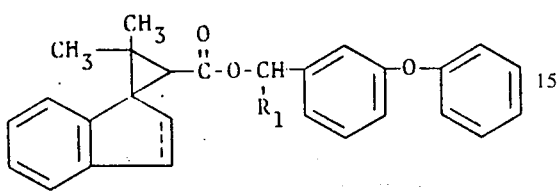

and 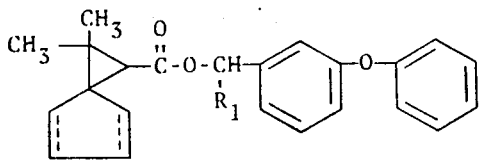

wherein $R_1$ is hydrogen, cyano or ethynyl, and represents a single or double bond, and the optical and geometric isomers thereof.

2. A method according to claim 1, wherein the compound has the structure:

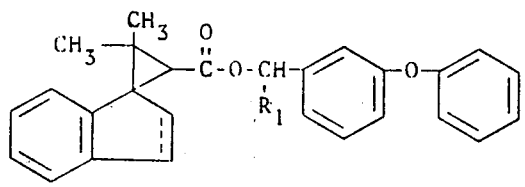

wherein $R_1$ is hydrogen, cyano or ethynyl, is a single or double bond, and the steroisomers of said compounds.

3. A method according to claim 1, wherein the compound has the structure:

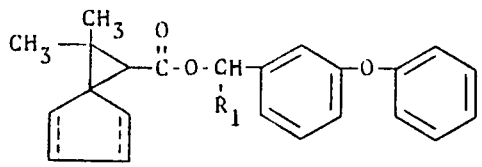

wherein $R_1$ is hydrogen, cyano or ethynyl, and is a single or double bond, and the stereoisomers of said compounds.

4. A method according to claim 1, wherein the compound is administered, orally or parenterally, to the animal host at a dose level of from 25 mg/kg of animal body weight to about 1000 mg/kg of animal body weight.

5. A method according to claim 2, wherein the compound is 2,2-dimethyl-4,5-benzospiro[2,4]hepta-4,6-diene-1-carboxylic acid, m-phenoxybenzyl ester.

6. A method according to claim 2, wherein the compound is 2,2-dimethyl-4,5-benzospiro[2,4]hepta-4,6-diene-1-carboxylic acid, α-cyano-m-phenoxybenzyl ester.

7. A method according to claim 2, wherein the compound is 2,2-dimethyl-4,5-benzospiro[2,4]hepta-4-ene 1-carboxylic acid, m-phenoxybenzyl ester.

8. A method according to claim 2, wherein the compound is 2,2-dimethyl-4,5-benzospiro[2,4]hepta-4-ene 1-carboxylic acid, α-cyano-m-phenoxybenzyl ester.

9. A method according to claim 3 wherein the compound is 2,2-dimethylspiro[2,4]hepta-4,6-diene-1-carboxylic acid, m-phenoxybenzyl ester.

10. A method according to claim 3 wherein the compound is 2,2-dimethylspiro[2,4]hepta-4,6-diene-1-carboxylic acid, α-cyano-m-phenoxybenzyl ester.

* * * * *